United States Patent [19]
Robinson

[11] Patent Number: 5,799,743
[45] Date of Patent: Sep. 1, 1998

[54] DRIVE SYSTEM

[75] Inventor: Allen Clifford Robinson, Nanaimo, Canada

[73] Assignee: Inuktun Services Ltd., Cedar, Canada

[21] Appl. No.: 788,610

[22] Filed: Jan. 24, 1997

[51] Int. Cl.$^6$ ................................................ B62D 55/00
[52] U.S. Cl. ............................................................ 180/9.1
[58] Field of Search ................................ 180/9.1, 9.42, 180/9.62; 74/740, 413, 414, 412 R; 305/47, 157

[56] References Cited

U.S. PATENT DOCUMENTS

| | | | |
|---|---|---|---|
| 4,431,073 | 2/1984 | Nagao | 180/6.48 |
| 5,193,632 | 3/1993 | Clar | 180/91 |
| 5,373,909 | 12/1994 | Dow | 180/9.1 |

*Primary Examiner*—Robert J. Oberleitner
*Assistant Examiner*—C. T. Bartz
*Attorney, Agent, or Firm*—C. A. Rowley

[57] ABSTRACT

A sealed drive system for driving a drive wheel of a miniature vehicle includes a drive gear, a transfer gear and a driven gear mounted in an inside pocket, an outside pocket and a second inside pocket respectively formed in a first side plate. The transfer pocket is sealed via a gear cover closing the outside pocket, the first inside pocket is sealed to a housing in which a shaft mounting a drive gear is rotatably mounted and the second inside pocket is sealed to one side of the driven wheel. The driven wheel and driven gear are fixed together and are rotatably mounted on a shaft fixed at its axial ends to the first and a second side plate. The axial end of the driven wheel remote from the driven gear is sealed via a suitable seal. Similarly the opposite sides of the housing are are sealed one to each of the said plates and a rotatable seal is formed between the first side plate and the adjacent face of the first side plate so that a seal chamber is formed from the housing to the first inside pocket, to the transfer pocket to the second inside pocket and to the axial end of the wheel adjacent to the first side plate and between the axial and of the drive wheel remote from the driven gear to the second side plate so that all the gears and bearings may be lubricated from a common source of lubricant and the system is completely sealed.

12 Claims, 2 Drawing Sheets

DRIVE SYSTEM

FIELD OF THE INVENTION

The present invention relates to a drive system. More particularly, the present invention relates to a sealed drive system for driving a drive wheel.

BACKGROUND OF THE INVENTION

Drive systems, particularly for driving a track used to propel mini vehicles, for example, for transporting a camera or the like along the length of a small pipe or large pipe and under very adverse conditions generally derive their power from an electric motors, preferefably using a dedicated motor and drive train for delivering the power to the drive wheel of each track. In the majority of these devices used a drive chain as part of the drive train to the drive wheel for the track. The drive gear, driven gear and chain were housed within a single well or pocket within one of the side plates of the system. While this drive arrangement did prove satisfactory it also led to significant problems in sealing the lubrication system and preventing loss of lubricant from or infusion of contaminating materials into the gear train.

Such drive systems have been manufactured and sold by Inuktun Services Limited and have found to perform with excellent results in many different applications in many different locations around the world.

BRIEF DESCRIPTION OF THE PRESENT INVENTION

It is an objective of the present invention to provide an improved drive train system and housing therefor to substantially eliminate leakage into or from the driven train compartment.

Broadly, the present invention relates to a sealed drive train system for driving a drive wheel comprising a first side plate, a second side plate opposite said first side plate, a hollow housing between said first and second side plates, said hollow housing having a pair of opposed open ends, a first side sealing means sealing one of said opposed open ends of said housing, said second side plate having a first inside pocket, a second sealing means sealing the other opening of said housing to said second side plate around said first inside pocket means, a first shaft rotatably mounted in said housing with one axial end of said first shaft extending into said first inside pocket means, said first shaft mounting a first driven gear and a first drive gear, said first drive gear being positioned within said first inside pocket means, an outside pocket means opening to the opposite side of said second side plate then said first inside pocket means, a transfer gear, a transfer shaft means substantially parallel to said first shaft, said transfer shaft mounting said transfer gear within said outside pocket for rotation about a longitudinal axis said transfer shaft, a cover plate, said cover plate sealing said outside pocket with said transfer gear therein, a second inside pocket means on a side of said outside pocket means remote from said first inside pocket means, a second shaft extending between said first and second side plates, said second shaft being substantially parallel to said first shaft, bearing means mounting said drive wheel for rotation about a longitudinal axis of said second shaft, a second driven gear positioned within said second inside pocket means, said second driven gear being fixed to and rotatable with said drive wheel, said first drive gear, said transfer gear and said second driven gear being positioned to mesh and form a portion of said drive train for delivering power to said driven wheel, a rotatable seal means interposed between said second side panel and said drive wheel to form a sealed passage between said second inside pocket and the interior of said drive wheel and a closure seal on the side of said drive wheel adjacent to said first side panel.

Preferably, said system will further comprise a drive motor mounted between said first and second side plates with its axis of rotation extending substantially perpendicular to said first shaft, a second drive gear coupled to a drive shaft of said motor and received into said housing via an opening, said second drive gear mating with said first driven gear within said housing to drive said first shaft and said drive gear, and sealing means sealing said opening into said housing.

Preferably securing means will fix one axial end said second shaft to said second side plate and a securing bolt means will extend through a bottom of said second inside pocket and axially of said second shaft will secure an opposite axial end of said second shaft to said first side plate.

Preferably, said system will further comprise a motor housing connected to said housing by a pair of rods projecting from said housing and extending through said motor housing and an end cap for said motor housing positioned on the end of said motor housing remote from said housing, said motor housing receiving said motor therewithin, means cooperating with said rods for forcing said end cap of said motor housing and said motor housing toward said housing.

Preferably, said system will further comprise an axle having its axis substantially parallel to the axis of said fixed shaft mounted between said first and second side plates adjacent to an end of said side plates remote from said second shaft, an idler wheel mounted for rotation on said axle, said driven wheel and said idler wheel being substantially aligned and centred between said side plates to receive a track means around their peripheries.

BRIEF DESCRIPTION OF THE DRAWINGS

Further features, objects and advantages will be evident from the following detailed description of preferred embodiments of the present invention taken in conjunction with the accompanying drawings in which.

DETAILED DESCRIPTION OF THE PRESENT INVENTION

Figure 1:
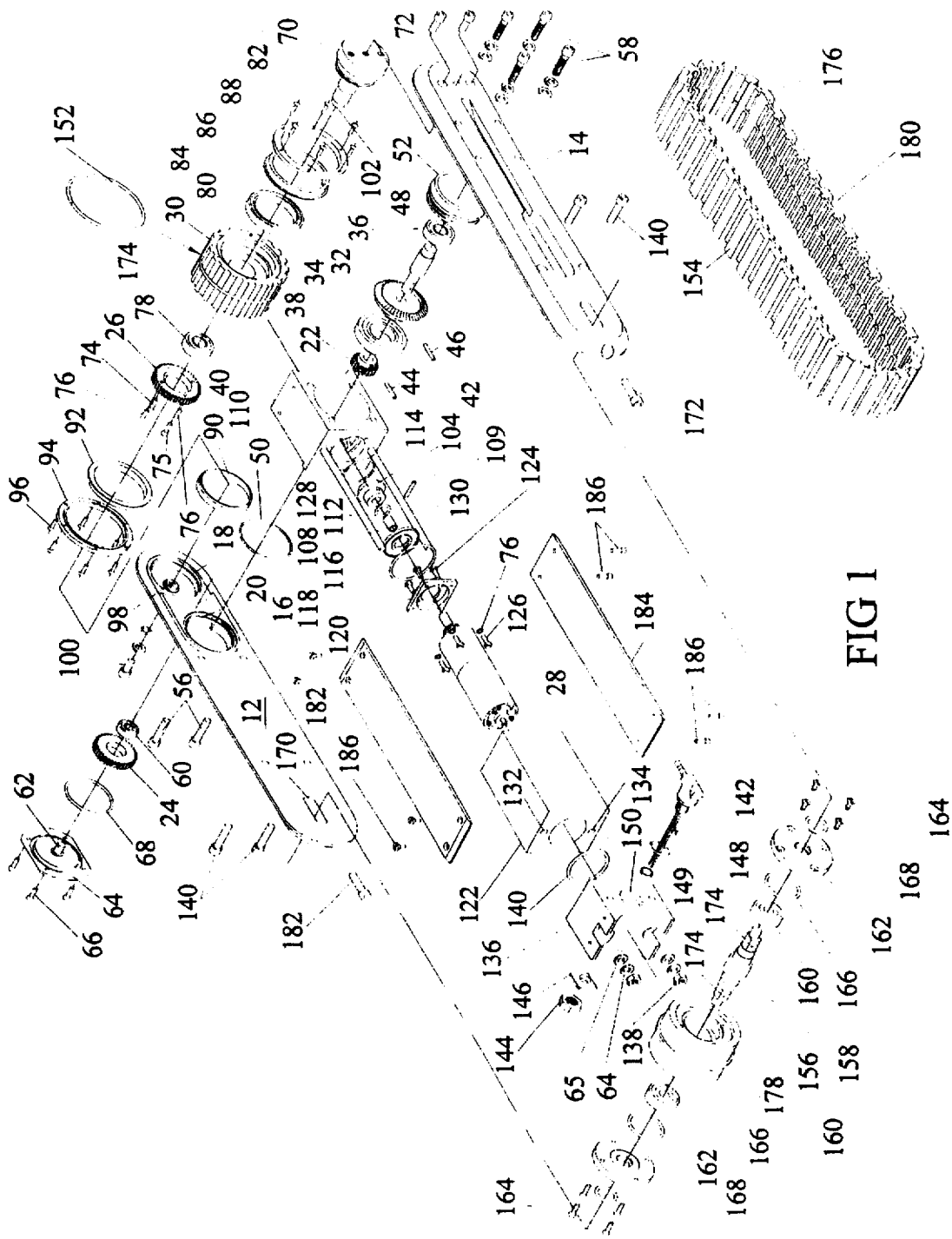
FIG. 1 is an exploded view of one form of drive system constructed in accoradance with the present invention.
Figure 2:
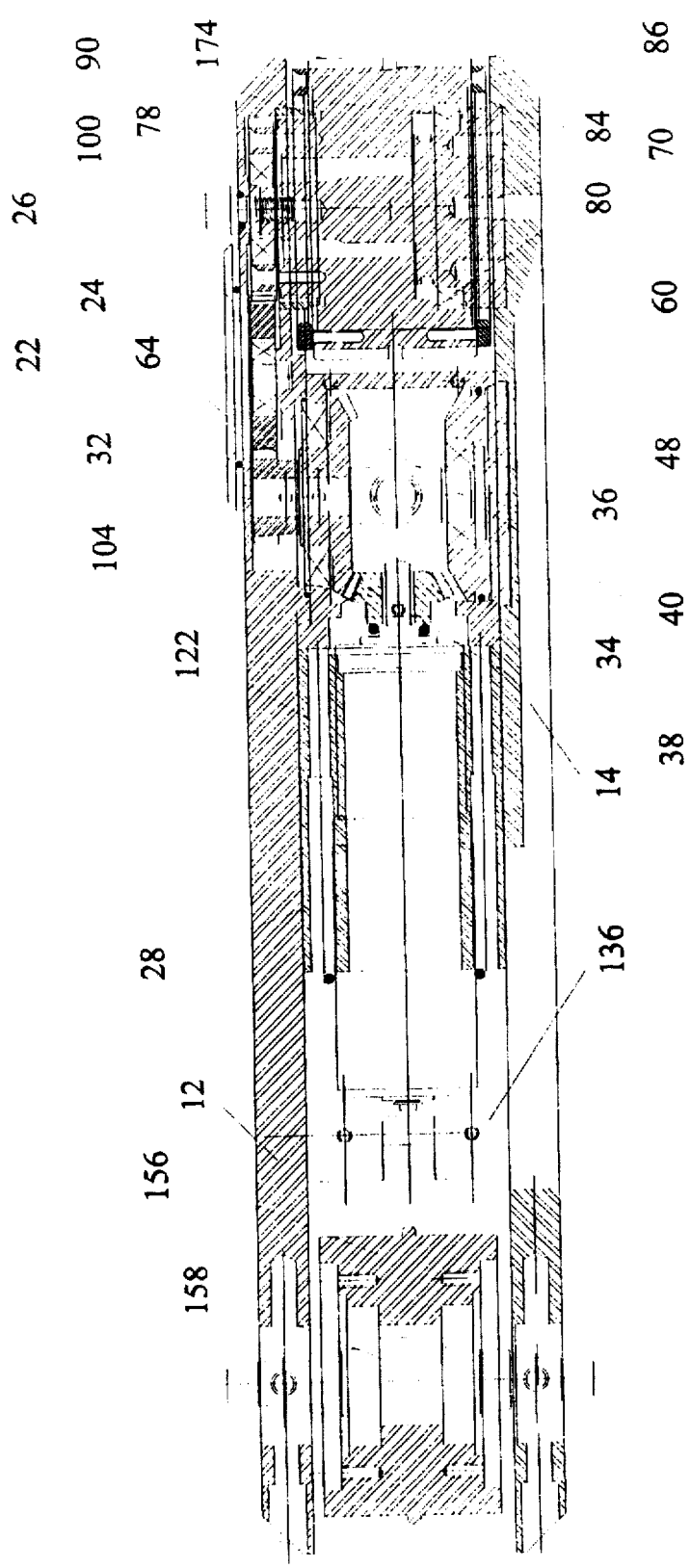
FIG. 2 is a cross-section through the assembled drive system of Figure illustrating the manner in which the various parts interfit and seal the drive train.

As shown in the exploded view in FIG. 1, the drive system 10 of the present invention is composed of a first side plate 12 and a second side plate 14 between which the drive train of the present invention is contained.

The first side plate at 12 has a first inside pocket 16 and a second inside pocket 18. The second inside pocket 18 is positioned adjacent to one end of the side plate 12 and the first inside pocket 16 positioned adjacent thereto, but with an outside pocket 20 interposed there between. The pockets 16, 18 and 20 are blind holes in that they do not extend through the full thickness of the side plate 12 and are positioned to receive the first drive gear 22, the transfer gear 24 and a second driven gear 26 which intermesh and form part of a drive train a drive motor 28 and a driven wheel 30.

The first drive gear 22 is fixed to a first shaft 32 to which is also fixed a first driven (bevelled) gear 34. Bearings 36 and 38 mount the shaft 32 in a hollow housing 40 in which the bevel gear 34 is contained. The hollow housing 40 has a pair of open ends 42 (only one shown). Suitable pins 44 and 46 respectively connect the first drive gear 22 and the first driven gear 34 respecively to the shaft 32.

The bearing 38 is mounted within the housing 40 while the bearing 36 is received within and supported by bearing carrier 48.

A first O-ring seal 50 and a second O-ring seal 52 is interposed respectively between the side plates 12 and 14 and the opposite sides of the housing 40. The O-ring 50 encircles the pocket 16. The first side plate 12 is secured to one face of the housing 40 via bolts 56 which clamp the O-ring 50 between the housing 40 and the side plate 12 to seal the pocket 16 and one of the opposed outlets of the housing 40 together and prevent leakage there between. The second side plate 14 is secured by suitable bolts and washers 58 to the other side of the housing 40 to seal the other of the pair of opposed outlets 42 of the housing 40 via O-ring 52 to the second side plate 14 thus the power train formed by the shaft 32 and its two gears 34 and 22 are sealed within the pocket 16 and the housing 40 via the rings 50 and 52 positioned at opposite sides of the housing 40.

The transfer gear 24 is mounted on a suitable bearing 60 for rotation on the shaft 62 which is parallel to the first shaft 32 and, in the illustrated arrangement, forms part of the gear cover 64. This transfer gear 24 meshes with the drive gear 22 and is rotated thereby. The gear cover 64 is secured to the outer face of the side plate 12 by suitable bolts or the like 66 to clamp the sealing ring 68 between the gear cover 64 and the adjacent face of the side plate 12 to thereby seal the pocket 20 with the transfer gear 24 retained therein for rotation around the axis of the shaft 62.

The second driven gear 26 mates with the transfer gear 24 and is mounted on a second shaft 70 that is parallel to the first shaft 32 and is fixed to the second side plate 14 via bolts or the like 72 so that the axis of the shaft 70 positions the gear 26 to mesh with the gear 24 thereby completing the gear train from the gear 22 via the gear 24 to the gear 26.

The second driven gear 26 is bolted to one side of the drive wheel 30 via screws 74 and roll pins 76 and is mounted together with the drive wheel 30 for rotation on the shaft 70 via a suitable bearing 78 which to provides a bearing adjacent to one axial end of the wheel 30 and by bearing 80 adjacent to the opposite axial end of wheel 30. The bearing 80 is mounted on a stepped area 82 to the shaft 70.

The side of the wheel 30 adjacent to the second side plate 14 is sealed to the outer surface of the shaft 70 via a suitable seal bearing 84 that is secured to the side of the wheel 30 held in place via a suitable seal retainer 86 that is secured to the wheel 30 via suitable screws or the like 88.

To provide a seal between the plate 12 and its adjacent face of the wheel 30, a suitable ring seal 90 is fixed into the pocket 18 and fits within the seal bearing 92 which is retained in position on the side of the wheel adjacent to the side plate 12 via a suitable retainer 94 held in position by suitable screws 96 to clamp the bearing seal 92 to the face of the wheel 30 in the same manner as the bearing seal 84 is clamped to the opposite face of the wheel 30.

The pocket 18 has an axiel hole 98 through which a bolt 100 extends and is threaded into the free end 102 of the shaft 70 thereby connecting the two side plates 12 and 14 rigidly together via the one end of the shaft 70 being bolted to the second side plate 14 and the other end bolted via bolt 100 to the other side frame 12. This together with the coupling of the side frames together through the block of housing 40 provides a structure of adequate strength.

The motor 28 is coupled to a bevelled (second) drive gear 104 via a pinion sleeve 106 which is coupled to the pinion 104 via a rollpin or the like 108.

The drive gear 104 passes through hole 110 in the housing 40 into a position to mesh with the driven bevel gear 34 and a seal is formed around the opening 110 by the O-rings 112 and 114 that cooperate with the O-ring retainer 116 via an O-ring seal 118 that forms a seal between the cover plate 120. The cover plate holds the motor 28 within its housing 122 via bolts 124 and the motor 28 is secured to the plate 120 by suitable screws 126.

The motor seal and mounting the motor to the housing 40 is completed by a pair of threaded bolts 128 and 130 which project from the housing 40 on opposite sides of the opening 110 and pass through the suitable passages 132 and 134 in the housing 122 and into corresponding passages in the end motor housing end block 136 and nuts 138 that clamp the parts together including the O-ring seal 140 that is interposed between the end block 136 and the housing 122.

In this manner, a completely sealed gear train extends from the block 40 to the wheel 30 so that the whole of the gear train may be lubricated and sealed within a single chamber defined by the inside of the housing 40 and which is sealed by the O-ring 52 and the plate 14 through the pocket 16 sealed to housing 40 via O-ring 50, pocket 20 sealed by O-ring 68, pocket 18 sealed to one end of the wheel 30 via seal ring 90 and the bearing seal 92 which wheel 30 at its opposite end is sealed to the shaft 70 by bearing seal 84.

After the device has been assembled as described, suitable anchoring bolts are passed through the side plates 12 and 14 and screwed into suitable threaded holes in the end block 136 to further secure the side plates together.

Suitable means for delivering power (electric power) to the motor 28 provided via the connector 142 which is bolted to the end block 136 via a suitable bolt 144 and washer 146 with a suitable O-ring seal 148 sealing the inlet hole 150 for inputting electrical power.

In most cases, the present invention will be used for driving a track thus the drive wheel will be fitted with a central ring 152 to guide the movement of a track 154 and the opposite end of the track will be guided by an idler wheel 156 which is mounted on a shaft 158 via suitable bearings 160 and 162. The shaft 158 extends between the side plates 12 and 14 and is substantially parallel to the other shafts 32, 62 and 70.

Suitable seal carriers 162 are bolted to opposite axial ends of idler wheel 156 via bolts 164 to retain O-rings 166 in sealing relationship with the wheel 156. Suitable seals 168 are provided adjacent opposite ends of the shaft 158 to seal the interior of the wheel 156 to the axle or shaft 158.

The axle 158 projects beyond the end seals 162 and each axial end is received within its corresponding slot 170 formed in the side plates 12 and 14 respectively. Tension screws 172 mate with threaded openings 174 (one adjacent to each axle end of the shaft 158) to adjust the position of the axle 158 and thus the idler wheel 156 relative to the shaft 70 and the drive wheel 30.

As above indicated the track 154 receives the drive wheel 30 and idler wheel 156 and is driven by lugs 174 on the drive wheel 30 cooperating with corresponding grooves 176 formed in the track 154. The track is maintained in alignment via the circumferential ring 152 on the drive wheel 30 and the circumferential ring 178 formed on the idler wheel 156 which cooperate with the circumferential groove 180 on the inside of the track 154.

To facilitate the gliding movement of the track, the inside of the track 154 is supported or movement over the housings 40, 122 and end block 136 via slide plates 182 and 184 bolted via suitable screws 186 to the top and bottom of the housing 40 and end cap 136.

The above described system provided a direct drive to the drive wheel 30. If desired the gear 26 may be coupled to the wheel 30 via a two-way clutch such as that shown in U.S. Pat. No. 5,307,911 issued May 3, 1994 to Robinson.

Having described the invention modifications will be evident to those skilled in the art without departing from the scope of the invention as defined in the appended claims.

I claim:

1. A sealed drive train system for driving a drive wheel comprising a first side plate, a second side plate opposite said first side plate, a hollow housing between said first and second side plates, said hollow housing having a pair of opposed open ends, a first side sealing means sealing one of said opposed open ends of said housing, said first side plate having a first inside pocket, a second sealing means sealing the other opening of said housing to said first side plate around said first inside pocket a first shaft rotatably mounted in said housing with one axial end of said first shaft extending into said first inside pocket, said first shaft mounting a first driven gear and a first drive gear said first drive gear being positioned within said first inside pocket an outside pocket opening to the opposite side of said first side plate than said first inside pocket, a transfer gear, a transfer shaft substantially parallel to said first shaft, said transfer shaft mounting said transfer gear within said outside pocket for rotation about a longitudinal axis said transfer shaft, a cover plate, said cover plate sealing said outside pocket with said transfer gear therein, a second inside pocket on a side of said outside pocket remote from said first inside pocket, a second shaft extending between said first and second side plates, said second shaft being substantially parallel to said first shaft, bearing means mounting said drive wheel for rotation about a longitudinal axis of said second shaft, a second driven gear positioned within said second inside pocket, said second driven gear being fixed to and rotatable with said drive wheel, said first drive gear, said transfer gear and said second driven gear being positioned to mesh and form a portion of said drive train system for delivering power to said driven wheel, a seal means interposed between said first side panel and said drive wheel to form a sealed passage between said second inside pocket and the interior of said drive wheel and a closure seal on the side of said drive wheel adjacent to said second side plate.

2. A sealed drive train system for driving a drive wheel as defined in claim 1 wherein further comprising a drive motor mounted between said first and second side plates with its axis of rotation extending substantially perpendicular to said first shaft, a second drive gear coupled to a drive shaft of said motor and passing through an opening through said housing into said housing into mating relationship with said first driven gear within said housing to drive said first shaft and said drive gear, and means for sealing said opening into said housing.

3. A sealed drive train system for driving a drive wheel as defined in claim 1 wherein securing means fix one end said second shaft to said second side plate and a securing bolt means extend through a bottom of said second inside pocket and axially of said second shaft to secure an opposite end of said second shaft to said first side plate.

4. A sealed drive train system for driving a drive wheel as defined in claim 2 wherein securing means fix one end said second shaft to said second side plate and a securing bolt means extend through a bottom of said second inside pocket and axially of said second shaft to secure an opposite end of said second shaft to said first side plate.

5. A sealed drive train system for driving a drive wheel as defined in claim 2 wherein said system further comprises a motor housing connected to said housing by a pair of bolts projecting from said housing and extending through said motor housing and an end cap for said motor housing on the end of said motor housing remote from said housing, said motor housing receiving said motor therewithin, means cooperating with said bolts for forcing said end cap of said motor housing and said motor housing toward said housing.

6. A sealed drive train system for driving a drive wheel as defined in claim 4 wherein said system further comprises a motor housing connected to said housing by a pair of bolts projecting from said housing and extending through said motor housing and an end cap for said motor housing on the end of said motor housing remote from said housing, said motor housing receiving said motor therewithin, means cooperating with said bolts for forcing said end cap of said motor housing and said motor housing toward said housing.

7. A sealed drive train system for driving a drive wheel as defined in claim 1 wherein said system further comprises an axle having its axis substantially parallel to the axis of said first shaft mounted between said first and second side plates adjacent to an end of said side plates remote from said second shaft, an idler wheel mounted for rotation about said axle, said driven wheel and said idler wheel being substantially aligned and centred between said side plates to receive a track means around their peripheries.

8. A sealed drive train system for driving a drive wheel as defined in claim 2 wherein said system further comprises an axle having its axis substantially parallel to the axis of said first shaft mounted between said first and second side plates adjacent to an end of said side plates remote from said second shaft, an idler wheel mounted for rotation about said axle, said driven wheel and said idler wheel being substantially aligned and centred between said side plates to receive a track means around their peripheries.

9. A sealed drive train system for driving a drive wheel as defined in claim 3 wherein said system further comprises an axle having its axis substantially parallel to the axis of said first shaft mounted between said first and second side plates adjacent to an end of said side plates remote from said second shaft, an idler wheel mounted for rotation about said axle, said driven wheel and said idler wheel being substantially aligned and centred between said side plates to receive a track means around their peripheries.

10. A sealed drive train system for driving a drive wheel as defined in claim 4 wherein said system further comprises an axle having its axis substantially parallel to the axis of said first shaft mounted between said first and second side plates adjacent to an end of said side plates remote from said second shaft, an idler wheel mounted for rotation about said axle, said driven wheel and said idler wheel being substantially aligned and centred between said side plates to receive a track means around their peripheries.

11. A sealed drive train system for driving a drive wheel as defined in claim 5 wherein said system further comprises an axle having its axis substantially parallel to the axis of said first shaft mounted between said first and second side plates adjacent to an end of said side plates remote from said second shaft, an idler wheel mounted for rotation about said axle, said driven wheel and said idler wheel being substantially aligned and centred between said side plates to receive a track means around their peripheries.

12. A sealed drive train system for driving a drive wheel as defined in claim 6 wherein said system further comprises an axle having its axis substantially parallel to the axis of said first shaft mounted between said first and second side plates adjacent to an end of said side plates remote from said second shaft, an idler wheel mounted for rotation about said axle, said driven wheel and said idler wheel being substantially aligned and centred between said side plates to receive a track means around their peripheries.

* * * * *